United States Patent
Keeler

(10) Patent No.: US 10,505,939 B2
(45) Date of Patent: Dec. 10, 2019

(54) SYSTEM ACCOUNT ACCESS MANAGER

(71) Applicant: Timothy Keeler, San Francisco, CA (US)

(72) Inventor: Timothy Keeler, San Francisco, CA (US)

( * ) Notice: Subject to any disclaimer, the term of this patent is extended or adjusted under 35 U.S.C. 154(b) by 112 days.

(21) Appl. No.: 15/151,497

(22) Filed: May 11, 2016

(65) Prior Publication Data

US 2016/0366146 A1    Dec. 15, 2016

Related U.S. Application Data

(60) Provisional application No. 62/159,845, filed on May 11, 2015.

(51) Int. Cl.
 *H04L 29/06* (2006.01)
 *H04L 12/24* (2006.01)

(52) U.S. Cl.
 CPC ............ *H04L 63/102* (2013.01); *H04L 41/00* (2013.01); *H04L 63/08* (2013.01); *H04L 63/104* (2013.01); *H04L 2463/082* (2013.01)

(58) Field of Classification Search
 CPC ... H04L 63/102; H04L 63/104; H04L 63/108; H04L 41/00; H04L 2463/082
 See application file for complete search history.

(56) References Cited

U.S. PATENT DOCUMENTS

| | | | | |
|---|---|---|---|---|
| 8,302,187 B1* | 10/2012 | Gupta | ................. | H04L 65/1079 713/182 |
| 8,881,249 B2* | 11/2014 | Nunn | ..................... | G06F 21/45 713/182 |
| 2002/0112186 A1* | 8/2002 | Ford | ..................... | H04L 63/101 726/7 |
| 2006/0225130 A1* | 10/2006 | Chen | ................... | H04L 63/0407 726/5 |

(Continued)

*Primary Examiner* — Paul E Callahan

(57) ABSTRACT

In one aspect, a computerized system of an access-manager server for managing account access includes a computer store containing data, wherein the data comprises a privileged-access information. The privileged-access information is gathered from a target-computer system on a network. The privileged-access information is used to authorize a privileged user to access to the target-computer system. A computer processor in the access-manager server, which computer processor gathers the privileged-access information from the target-computer system on a network. The computer processor detects that the information is gathered from the target-computer system. The computer processor removes an existing-account access from the target-computer system. The computer processor obtains the privileged-access information from the computer store. The computer processor enables a privileged user to log into the access manager server using multi-factor authentication. When the privileged user requests access to the target-computer system access via the access manager server, the computer processor verifies an account access is allowed for the privileged user. The computer processor adds the privi- (Continued)

leged user's account to the target-computer system for an interval specified by the access manager server. During the interval specified the privileged user is enabled to log on to the target-computer system.

4 Claims, 4 Drawing Sheets

(56) References Cited

U.S. PATENT DOCUMENTS

2007/0226783 A1* 9/2007 Mimlitsch .......... H04L 63/0815
  726/4
2013/0227303 A1* 8/2013 Kadatch ................ G06F 21/554
  713/193

* cited by examiner

SYSTEM ACCOUNT ACCESS MANAGER

CROSS-REFERENCE TO RELATED APPLICATIONS

This application is a claims priority from provisional U.S. Application No. 62/159,845 filed 11 May 2015. This application is hereby incorporated by reference in its entirety.

FIELD OF THE INVENTION

The invention is in the field of computer security and more specifically to a method, system and apparatus of methods of system account access manager.

DESCRIPTION OF THE RELATED ART

The embodiments herein relate generally to network administration. As technology continues to grow, managing system accounts and computer security is increasingly difficult. Previously, systems are vulnerable to a number of credential-based attacks that would permit an intruder's unauthorized access. As a result, computer security breaches are rapidly on the rise. Prior solutions persist system accounts, leaving systems vulnerable to credential-based attacks. Other devices and systems use rotating passwords with shared accounts for protection. This leaves systems vulnerable if the password is shared or compromised. Using shared accounts introduces audit, compliance and data-leakage problems.

BRIEF SUMMARY OF THE INVENTION

In one aspect, a computerized system of an access-manager server for managing account access includes a computer store containing data, wherein the data comprises a privileged-access information. The privileged-access information is gathered from a target-computer system on a network. The privileged-access information is used to authorize a privileged user to access to the target-computer system. A computer processor in the access-manager server, which computer processor gathers the privileged-access information from the target-computer system on a network. The computer processor detects that the information is gathered from the target-computer system. The computer processor removes an existing-account access from the target-computer system. The computer processor obtains the privileged-access information from the computer store. The computer processor enables a privileged user to log into the access manager server using multi-factor authentication. When the privileged user requests access to the target-computer system access via the access manager server, the computer processor verifies an account access is allowed for the privileged user. The computer processor adds the privileged user's account to the target-computer system for an interval specified to the access manager server. During the interval specified the privileged user is enabled to log on to the target-computer system.

In another aspect, a computerized method of managing account access includes the step of accessing a target computer system in a computer network. The method includes the step of removing a privileged account from the target computer system. The method includes the step of adding another privileged account on the target computer system on a per-needed basis as requested by a user.

In yet another aspect, a computer system for includes a target-computer system is accessed by a privileged user via an access-manager server. The computer system includes an access-manager server that gathers privileged-access information from a target-computer system on a network, wherein the privileged-access information is stored in a secure database on the access manager server, wherein the privileged-access information is used to authorize a privileged user to access to the target-computer system, wherein the access-manager server detects that the information is gathered from the target-computer system, and wherein the access manager server removes the existing account access from the target-computer system. The access manager enables a privileged user to log into the access manager server using two-factor authentication, wherein when the privileged user requests access to the target-computer system access via the access manager server. The access manager verifies an account access is allowed for the privileged user. The access manger adds the privileged user's account to the target-computer system for an interval specified by the access manager server, wherein during the interval specified the privileged user is enabled to log on to the target-computer system. The access manager removes the account access of the privileged user from the target computer system after the interval specified expires. The computer system includes a secure database in the access manager server that stores the privileged-access information.

Figure 1:
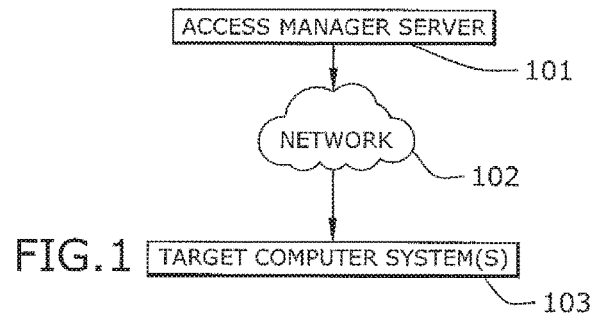
FIG. 1 illustrates an example system an access manager server connected to a target computer system(s) through a network, according to some embodiments.

The Figures described above are a representative set, and are not an exhaustive with respect to embodying the invention.

DESCRIPTION

Disclosed are a system, method, and article of a system account access manager. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth, in other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Access manager server can be a computer-based tool that inventories, stores, manages and deletes privileged-access information.

Computer network can be a telecommunications network which allows computers to exchange data.

Privileged-access information can be rules, definitions, lists or other data representations that are used by a computer operating system or application to determine which accounts (if any) are permitted to perform specific operating system or application functions restricted against use by non-privileged access users.

Multi-factor authentication can enable confirmation of a user's claimed identity by utilizing a combination of several different components. In some examples, when two-factor authentication is discussed, it can be replaced by multi-factor authentication in other example embodiments.

Privileged user can be an account, assigned to a person or an application and accessed via human-readable tools or via computer code only (for example, an API), for which valid privileged-access information exists and which can thus execute functions restricted for use by privileged users.

Example Methods and Systems

Figure 2:
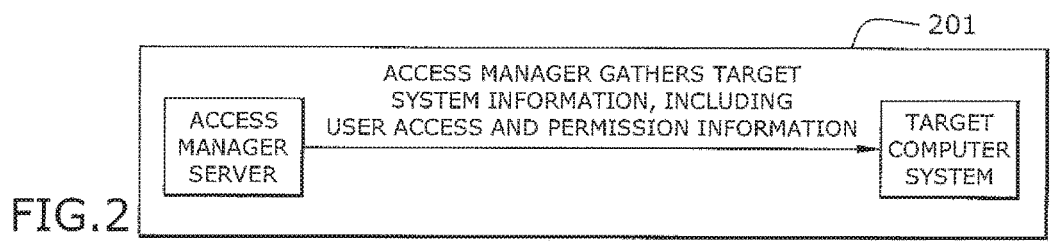
FIGS. 2-4 illustrate work flows for managing account access according to an embodiment of the subject technology, according to some embodiments.
Figure 3:
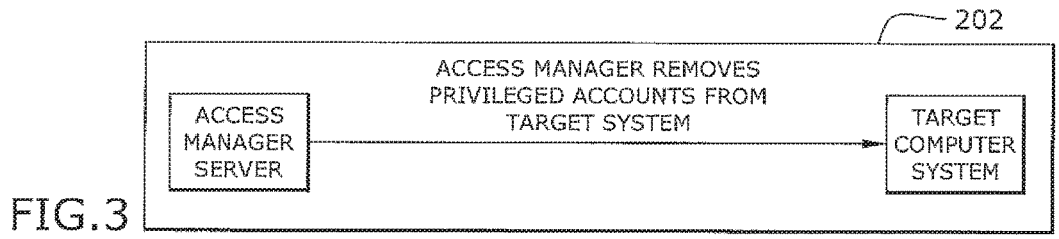
Figure 4:
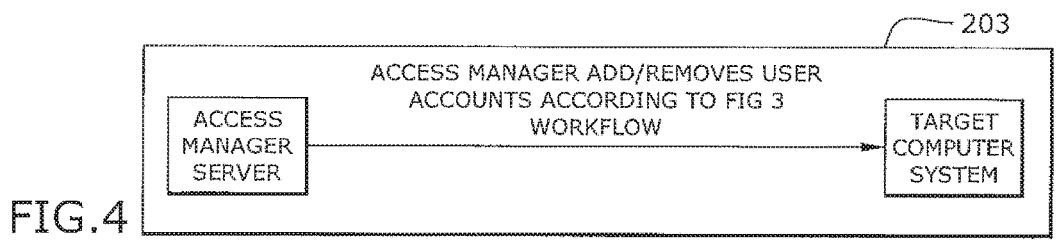

Broadly, embodiments of the subject technology address problems with persistent account access. In one aspect, an embodiment may provide a process via are which can provision and remove account access on target systems for only the interval necessary. This approach solves problems with audit, compliance, data-leakage, and reduces the overall attack vector for credential-based attacks. Referring now to FIG. 1, a system according to an exemplary embodiment of the subject technology generally includes an access manager server 101 connected to a target computer system (s) 103 through network 102. Referring now to FIGS. 2-4, the access manager server 101 may be configured to function according to the following to reduce vulnerability at the target computer system(s) 103. The access manager server 101 gathers target system information through the network 102, including user access and permission rights (e.g. FIG. 2). The access manager server 101 removes privileged accounts from the target systems (e.g. FIG. 3). The access manager server 101 can now add and/or remove privileged accounts on target computer system(s) 103 on a per-needed basis as requested by a user (for example, a network administrator) through the access manager server 101.

Figure 5:
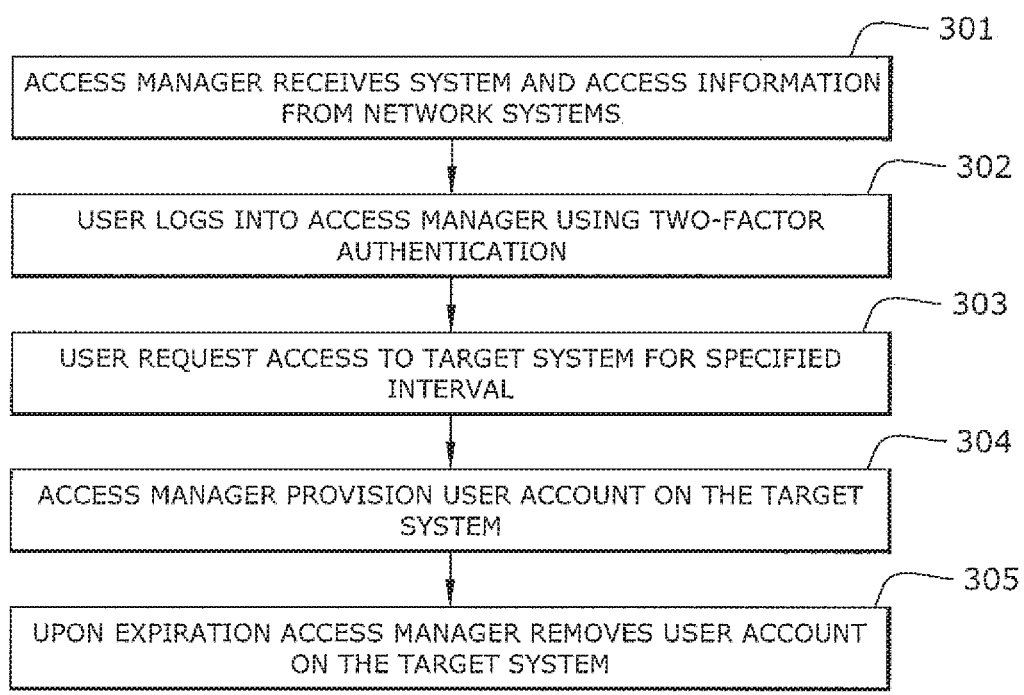
FIG. 5 illustrate a flowchart of a method of managing account access according to an embodiment of the subject technology, according to some embodiments.

FIG. 5 describes a method of managing account access according to an embodiment of the subject technology at a lower level of the process than FIGS. 2-4. In block 301, the access manager server 101 gathers privileged access information from the target systems on the network. This information is stored in a secure database on the access manager server 101 and used to authorize user access to the target system. Once the information is gathered from the target system, the access manager server 101 removes the existing account access from the target system. From this point on, the privileged user can use the access manager server 101 to gain access to the target system. In block 302, a user may log into the access manager server 101 using multi-factor authentication (e.g. two-factor authentication, more than two factor authentication, etc.). When a privileged user requests target system access (block 303) via the access manager server 101, the access manager server 101 verifies access is allowed. Upon verification, in block 304 the access manager server 101 adds the privileged user's account to the target system for an interval specified by the access manager server 101 (for example, 4 hours). During this period, the privileged user may log on to the target system. After the period expires the access manager server 101, in block 305 removes the user's account access from the target system, restoring the system to a secured state.

Figure 6:
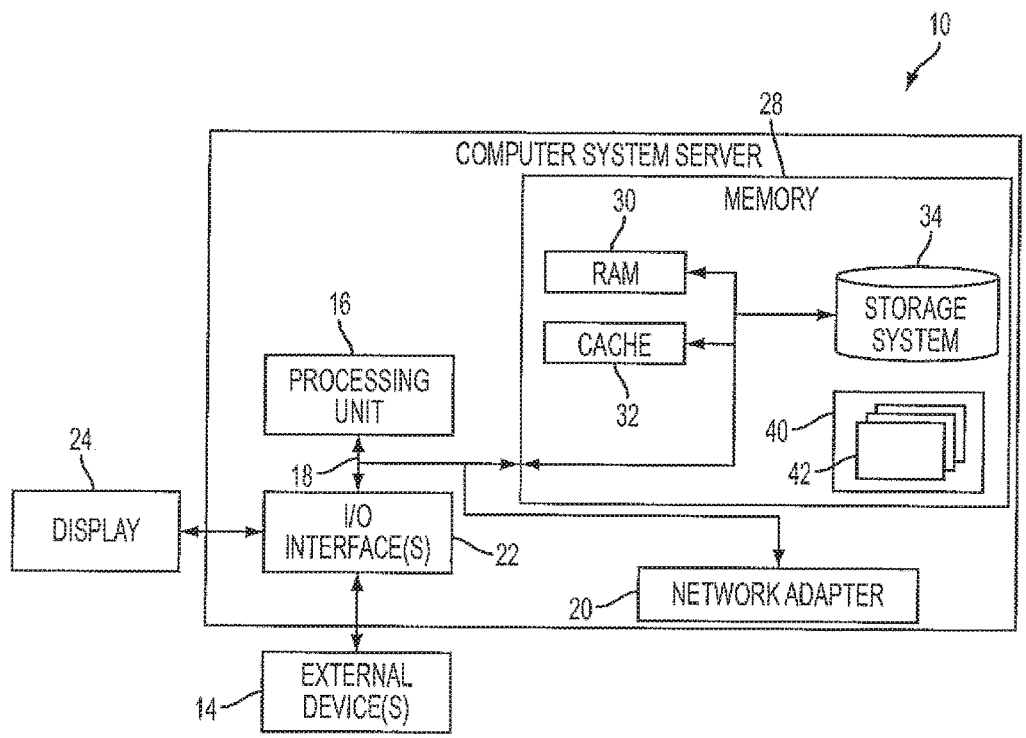
FIG. 6 is a block diagram of a sample-computing environment that can be utilized to implement some embodiments.

Referring to FIG. 6, a computer system/server 10 is described in more detail in terms of the machine elements that provide functionality to the systems and methods disclosed herein. The access manager server 101 and/or target computer system(s) 103 may function according to aspects of the computer system/server 10. The components of the computer system/server 10 may include, but are not limited to, one or more processors or processing units 16, a system memory 28, and a bus 18 that couples various system components including the system memory 28 to the processor 16. The computer system/server 10 may typically include a variety of computer system readable media. Such media could be chosen from any available media that is accessible by the computer system/server 10, including non-transitory, volatile and non-volatile media, removable and non-removable media. The system memory 28 could include one or more computer system readable media in the form of volatile memory, such as a random access memory (RAM) 30 and/or a cache memory 32. By way of example only, a storage system 34 can be provided for reading from and writing to a non-removable, non-volatile magnetic media device typically called a "hard drive" (not shown).

The system memory 28 may include at least one program product 40 having a set (e.g., at least one) of program modules 42 that are configured to carry out the functions of embodiments of the invention. The program product/utility, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein. For example, the program modules 42 may carry out the steps for accessing the target computer systems(s) 103, removing privileged accounts from the system, receiving access requests from privileged accounts, verifying authorized access, tracking logged in time by an account, and disconnecting access after expiration of an authorized time being logged in to the target computer system 103.

The computer system/server 10 may also communicate with one or more external devices 14 such as a keyboard, a pointing device, a display 24, etc.; and/or any devices (e.g., network card, modem, etc.) that enable the computer system/server 10 to communicate with one or more other computing devices. Such communication can occur via Input/Output (I/O) interfaces 22. Alternatively, the computer system/server 10 can communicate with one or more networks such as a local area network (LAN), a general wide area network (WAN), and/or a public network via a network adapter 20. As depicted, the network adapter 20 may communicate with the other components of the computer system/server 10 via the bus 18.

Figure 7:
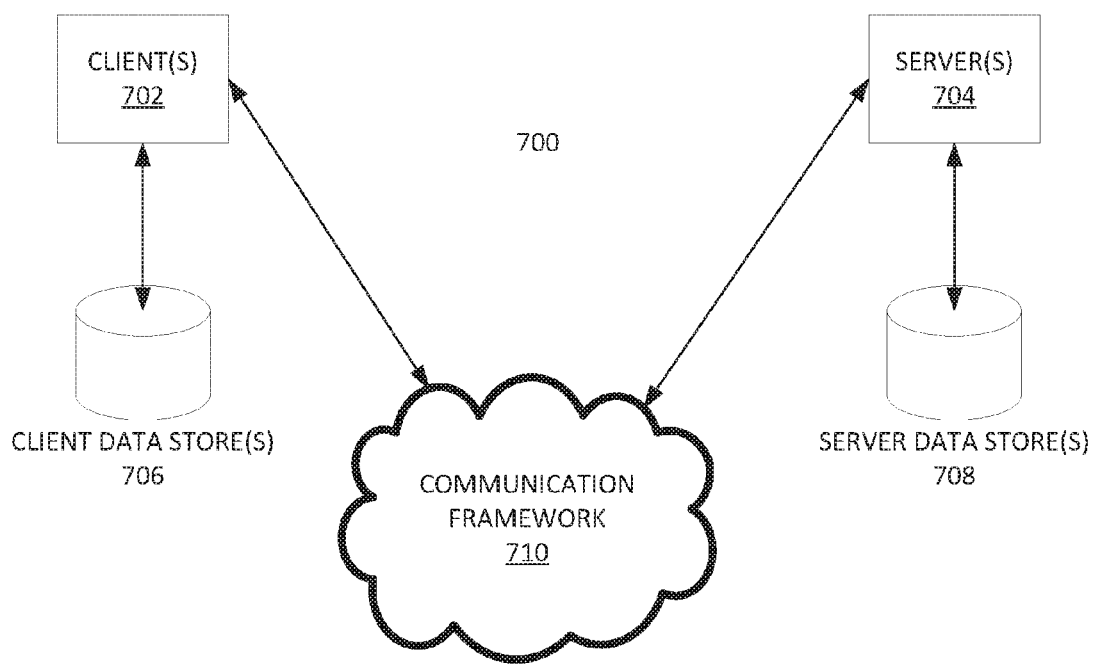
FIG. 7 is a block diagram of another sample-computing environment that can be utilized to implement some embodiments.

FIG. 7 is a block diagram of another sample-computing environment 700 that can be utilized to implement some embodiments. The system 700 further illustrates a system that includes one or more client(s) 702. The client(s) 702 can be hardware and/or software (e.g., threads, processes, computing devices). The system 700 also includes one or more server(s) 704. The server(s) 704 can also be hardware and/or software (e.g., threads, processes, computing devices). One possible communication between a client 702 and a server 704 may be in the form of a data packet adapted to be transmitted between two or more computer processes. The system 700 includes a communication framework 710 that can be employed to facilitate communications between the client(s) 702 and the server(s) 704. The client(s) 702 are, connected to one or more client data store(s) 706 that can be employed to store information local to the client(s) 702. Similarly, the server(s) 704 are connected to one or more server data store(s) 708 that can be employed to store information local to the server(s) 704.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 34) may be utilized. In the context of this disclosure, a computer readable storage medium may be any tangible or non-transitory medium that can contain, or store a program (for example, the program product 40) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 16, such that the instructions, which execute via the processor, create means for implementing the functions/acts specified in the flowchart and/or block diagram block or blocks.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g. embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized system of an access-manager server for managing account access comprising:
    a computer store containing data, wherein the data comprises:
        a privileged-access information, wherein the privileged-access information is gathered from a target-computer system on a network, wherein the privileged-access information is used to authorize a privileged user to access the target-computer system, and wherein the privileged-access information comprises at least one of a rule, definition or list that is used by the access-manager server to determine which accounts are permitted to perform specific operating system functions or application functions restricted against use by non-privileged access users, and wherein the privileged-access information does not comprise a password or other user input authentication data:
a computer processor in the access-manager server, which computer processor:
  gathers the privileged-access information from the target-computer system on a network;
  detects that the privileged-access information is gathered from the target-computer system;
  removes an existing account access from the target-computer system once the information is gathered from the target system;
  obtains the privileged-access information from the computer store;
  enables a privileged user to log into the access manager server using multi-factor authentication, wherein when the privileged user requests access to the target-computer system access via the access manager server,
  verifies an account access is allowed for the privileged user,
  adds the privileged user's account to the target-computer system for an interval specified by the access manager server, wherein during the interval specified the privileged user is enabled to log on to the target-computer system.

2. The computerized system of claim 1, wherein the compute store comprises a secure database.

3. A computer system for managing account access comprising:
  a target-computer system that is accessed by a privileged user via an access-manager server;
  an access-manager server that:
    gathers privileged-access information from a target-computer system on a network, wherein the privileged-access information is stored in a secure database on the access manager server, wherein the privileged-access information is used to authorize a privileged user to access the target-computer system, wherein the access-manager server detects that the information is gathered from the target-computer systems, wherein the access manager server removes the existing account access from the target-computer system once the information is gathered from the target system, and wherein the privileged-access information comprises at least one of a rule, definition or list that is used by the access-manager server to determine which accounts are permitted to perform specific operating system functions or application functions restricted against use by non-privileged access users, and wherein the privileged-access information does not comprise a password or other user input authentication data,
    enables a privileged user to log into the access manage server using multi-factor authentication, wherein when the privileged user requests access to the target-computer system access via the access manager server,
    verifies an account access is allowed for the privileged user,
    adds the privileged user's account to the target-computer system for an interval specified by the access manager server, wherein during the interval specified the privileged user is enabled to log on to the target-computer system,
    removes the account access of the privileged user from the target computer system after the interval specified expires; and
  a computer store containing data comprising a secure database in the access manager server that stores the privileged-access information.

4. The computer system of claim 3, wherein the specified period is an hour.

* * * * *